United States Patent [19]

Lapp

[11] Patent Number: 4,813,378
[45] Date of Patent: Mar. 21, 1989

[54] ANIMAL WATERING FOUNTAIN

[76] Inventor: Alvin K. Lapp, 116 N. Soudersberg Rd., Gordonville, Pa. 17529

[21] Appl. No.: 84,404

[22] Filed: Aug. 10, 1987

[51] Int. Cl.$^4$ ............................................. A01K 13/00
[52] U.S. Cl. ........................................ 119/73; 119/74
[58] Field of Search ...................... 119/72.5, 73, 74, 75

[56] References Cited

U.S. PATENT DOCUMENTS

| | | | |
|---|---|---|---|
| 439,290 | 10/1890 | Clapp | 119/74 |
| 1,228,224 | 5/1917 | Luke | 119/75 |
| 3,381,667 | 5/1968 | Martin | 119/75 |
| 3,547,083 | 12/1970 | Peterson | 119/75 |
| 3,618,570 | 11/1971 | Chevez | 119/75 |
| 3,831,558 | 8/1974 | Forbes | 119/73 |

Primary Examiner—Robert Peshock
Attorney, Agent, or Firm—William B. Noll

[57] ABSTRACT

An animal activated watering fountain in which intake and shut-off valves are located below the frost line to allow for year round use. That is, the fountain is not subject to freezing. The fountain is characterized by a hydrant or drain-back valve which can be activated to maintain the level of the water either below such frost line, i.e. freezing weather, or at the top of the water feed line, i.e. milder weather.

8 Claims, 2 Drawing Sheets

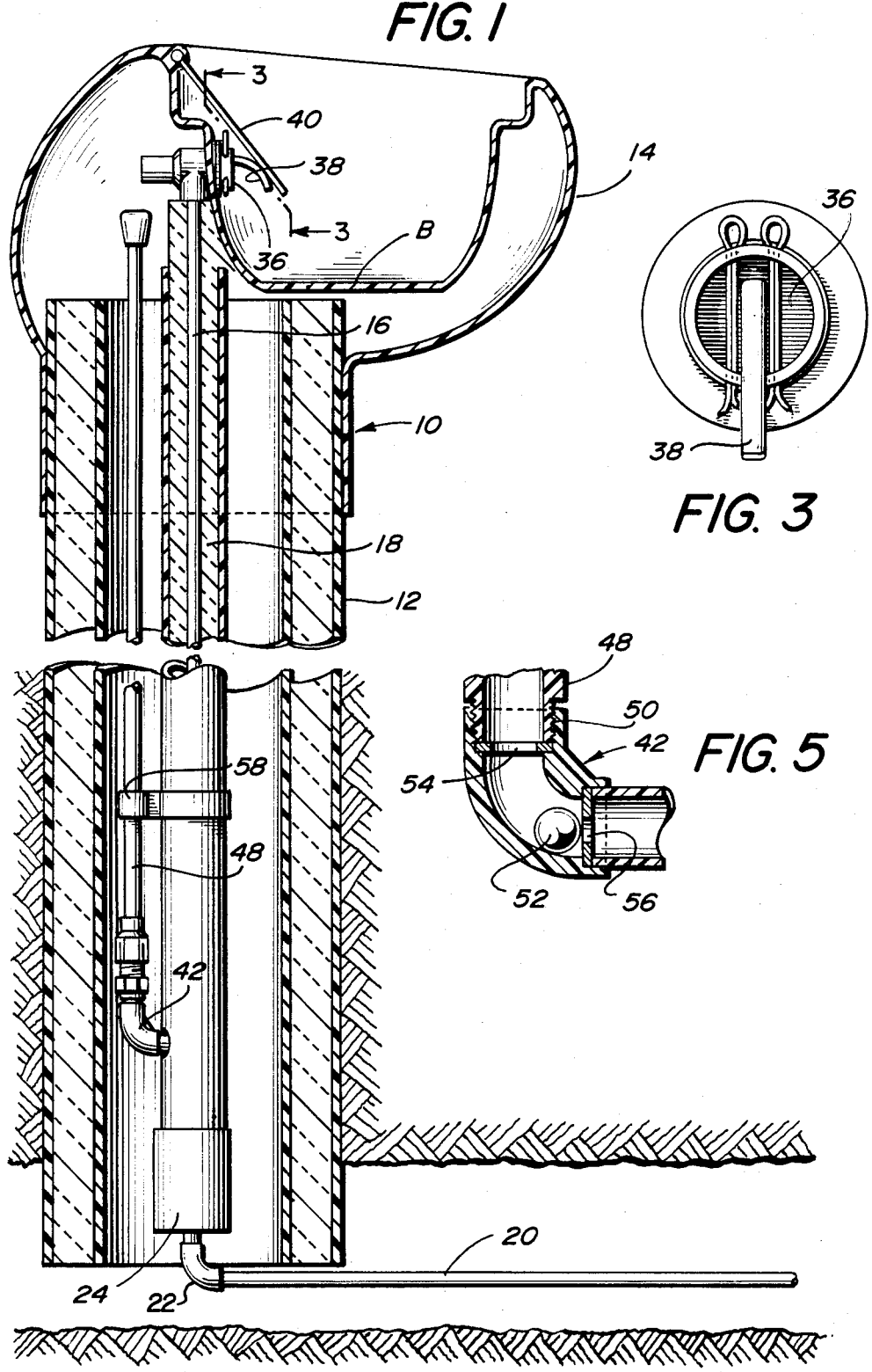

ANIMAL WATERING FOUNTAIN

BACKGROUND OF THE INVENTION

This invention is directed to an animal activated watering fountain, and is particularly adapted for use by livestock, such as dairy cattle. To be approved for dairy animals, it is necessary that the water source must be kept free of contamination. Such contamination can occur where the water feed line is in direct communication with the drinking bowl or trough. Such problem is one of the disadvantages of the watering fountain disclosed and claimed in U.S. Pat. No. 3,831,558 to Forbes. More particularly, water, from an underground source, is fed through a central water pipe into the bottom of the water basin. Even through such a system may be provided with means for draining, the presence of bacteria can contaminate the water supply.

A principal object of this invention is the provision of a dairy approved watering fountain for livestock. A further and just as significant an object, is the provision of an animal watering fountain which can be used year round, without the fear of freezing.

The features of this invention to achieve such objects, along with other objects, will become apparent upon reading the following specification. No limitation is intended to be imposed upon this invention, except as set forth in the claims appended hereto.

SUMMARY OF THE INVENTION

An animal watering fountain, particularly for use by livestock, which fountain resists freezing. An insulated column supports and encloses a bowl or trough within which ther is provided an animal activated lever. The lever, operating through a double linkage and reciprocating rod, operates a water feed line and hydrant or drain-back valve at the bottom of the column, well below the frost line. The water feed line drops water into said bowl or trough from above, thereby preventing contamination of the water line. After water stops flowing, it drains back and discharges below the frost line through a check valve which is closed when line water pressure is applied, thus preventing loss of water. For non-freezing weather operation, the drain-back can be eliminated from the top of the column by threading a long sealed pipe onto the top of said check valve. This causes an air pocket which maintains the water up to the top of the feed line for such non-freezing weather operation.

BRIEF DESCRIPTION OF THE DRAWINGS

FIG. 1 is a vertical elevation view, with portions in section to show internal detail, of the animal watering fountain according to this invention.

FIG. 3 is an enlarged top view taken along line 3—3 of FIG. 1, showing the animal activating lever for the animal watering fountain hereof.

FIG. 5 is an enlarged sectional view of the drain-back valve of this invention.

DESCRIPTION OF PREFERRED EMBODIMENT

Figure 4:
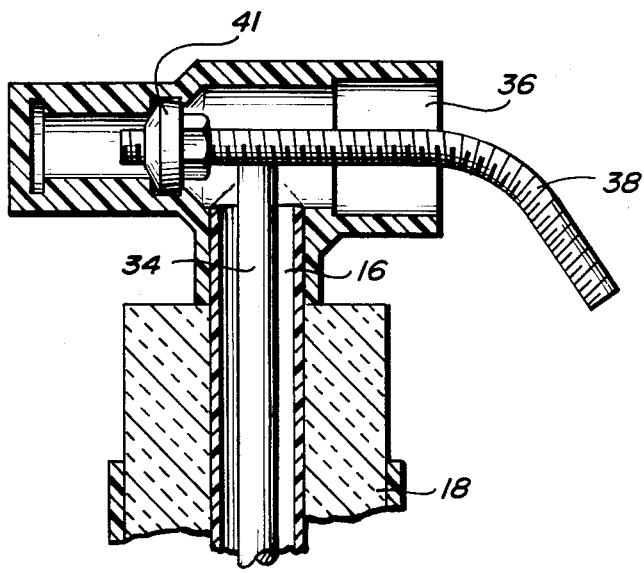
FIG. 4 is a sectional view of the lever mechanism shown in FIG. 3.

The animal watering fountain of this invention, as best illustrated in FIG. 1, has been engineered to operate in freezing temperatures as well as non-freezing temperatures. The ability to achieve this year round use of the fountain 10 can be appreciated from the several Figures and the description which follows.

Referring now to FIG. 1, the fountain 10 includes an insulated, tubular-like support 12 capped off by a water holding bowl or trough portion 14. The respective parts, 12 and 14, are mated simply by slipping trough portion 14 over the support 12. Should maintenance or inspection of the internal portions thereof be required, removal of portion 14 is a simple expedient.

Centrally disposed within the support 12 is a vertically disposed water feeding conduit 16, preferably insulated as shown by 18, for transporting water from a source pipe 20, below the frost line, to a position above the water holding bowl B.

Figure 2:
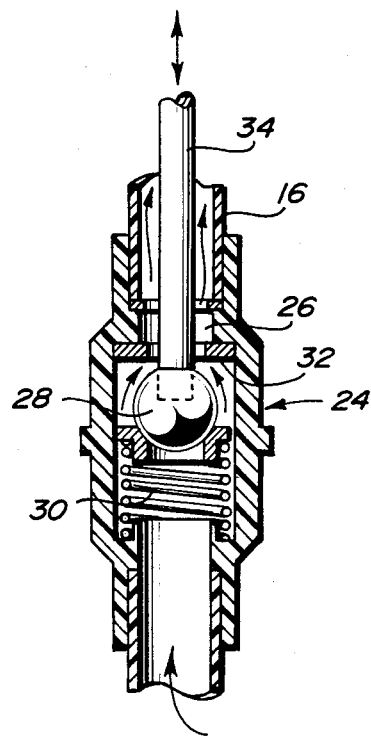
FIG. 2 is an enlarged sectional view of the check valve connecting the underground source of water to the vertical water feeding conduit of the animal watering fountain of this invention.

Joining conduit 16 with source pipe 20 through elbow 22, is check valve 24, illustrated in section in FIG. 2. Said valve 24 consists of a central opening 26 within which are located ball 28, and spring 30 normally in compression and operating to cause ball 28 to seat securely against the radially projecting ring 32. This effectively shuts off the flow of water through source pipe 20 into conduit 16.

Within conduit 16 there is provided a reciprocating rod 34, which rod is dimensioned to move axially within conduit 16, while at the same time allowing for the flow of water thereabout and up through the conduit 16 over the top 36 to fall into holding bowl B. Activation of rod 34 is accomplished by arm 38, pivoted for movement in a vertical plane. For convenience and to facilitate activation of the fountain by an animal, lever 40, in the form of a broad flat panel and pivoted for rotation at 42, is provided, see FIGS. 3 and 4. The animal desiring to drink will be drawn to the bowl B where contact is made with lever 40. Such lever, depresses arm 38 which forces reciprocating rod 34 downward forcing ball 28 to move downward. This releases ball 28 from its seat in ring 32 thereby allowing water to flow over ring 32 as shown by the arrows, and up the conduit 16. So long as lever 40 is depressed, water will flow up conduit 16 and out of the top and over rim 36 thereof and fall into bowl B. As the animal finishes watering, pressure is removed from lever 40 thereby permitting spring 30 to force ball 28 into the seat provided by ring 32.

Absent the addition of the drain-back feature to be described now, the fountain would necessarily retain water within conduit 16 well above the frost line. For operation in mild weather, when freezing is not a problem, the drain-back feature is not necessary. However, when cold weather brings on freezing conditions, provision must be made to reduce the level of standing water to below the frost line. In the present invention, this is achieved by the incorporation of a hydrant or drain-back valve 42 at the bottom of the water conduit 16.

The hydrant or drain-back valve 42, shown in section in FIG. 5, consists of a first opening 46 in communication with conduit 16. At the other end of valve 42, there is an elongated member 48, such as a sealed pipe, threadably engaged at 50 with valve 42, the function of which will be described later. Within valve 42 there is provided a non-floating ball 52 which is free to move in response to water pressure between the seat 54 and stop 56. It will be observed that ball 52, movable between seat 54 and stop 56, does not form a seal with stop 56. As the fountain is rendered inoperative and the flow of water stopped, the ball drops down the valve 42 to rest at the bottom thereof adjacent stop 54. However, in any case, such ball does not fully seat against stop 56 so that any water in valve 42 can bypass ball 52 and drain free.

For non-freezing weather operation, drain-back or a drop in water from the top of conduit 16 can be eliminated by threading member 48 into valve 42. This results in an air pocket developing in member 48 which maintains the water at the top of conduit 16. For operation of the fountain under conditions where freezing is a concern, member 48 is disengaged from valve 42. After the water stops flowing, i.e. lever 40 is deactivated, the water remaining in conduit 16 drains back and discharges below the frost line through valve 42 from which member 48 had been disengaged.

Since valve 42 is below ground, means are provided to align member 48 with valve 42 for engagement/disengagement therewith. Specifically, member 48 is aligned with conduit 16 by support 58 which permits member 48 to move in an axial direction. That is, lateral movement thereof is restricted so that the member 48 can easily be threaded into valve 42 from above ground.

Having described this invention in its most preferred embodiment, there are modifications thereto which are contemplated within the scope of the appended claims.

I claim:

1. An animal watering fountain comprising in combination, an animal activated system for supplying water from a source below the frost line, and an elevated water holding bowl or trough, where said system drops water into said bowl or trough, said system comprising:
   a vertically disposed water feeding conduit, where the lower end is below said frost line and the upper end is above said water holding bowl or trough,
   a source of water,
   a first check valve interconnecting said source of water and said conduit, where said first check valve is provided with a spring biased valve which in the closed position shuts off water to said conduit,
   a reciprocating rod disposed within said conduit and operable to open said spring biased valve to allow for the flow of water into said conduit,
   an animal activated lever mounted above said bowl or trough in operable contact with said reciprocating rod, and
   a drain-back valve near the bottom of said conduit above said first check valve, where said drain-back valve is operable to an open position to drain the water therefrom or a closed position to control the level of standing water in said conduit in the closed position, said drain back valve being operable to a closed position whereby the level of water is at the top of said conduit, and operable to an open position indicating a condition of pressure relief—therefrom with the water below said frost line.

2. The animal watering fountain according to claim 1 wherein said drain-back valve may be placed in said open or closed position from a location above the frost line.

3. The animal watering fountain according to claim 1 wherein said drain-back valve includes a vertical member in communication therewith, which member is operable to convert said drain-back valve from an open position to a closed position.

4. The animal watering fountain according to claim 3 wherein said member is a tubular conduit closed at the upper end thereof, with the lower end opening into and in communication with said drain-back valve.

5. A year-round outdoor animal watering fountain for use respectively above and below freezing temperatures comprising in combination, an animal activated system for supplying water from a source below the frost line, and an elevated water holding bowl or trough adapted to retain water at a selected level, said system comprising
   a vertically disposed water feeding conduit, where the lower end is below said frost line and the upper end is above the level of said water in the holding bowl or trough,
   a source of water,
   a first check valve at the lower end of said conduit interconnecting said source of water and said conduit which in the closed position shuts off water to said conduit,
   a rod disposed within said conduit and displaceable to open said first check valve to allow for the flow of water into said conduit,
   an animal activated lever mounted above said bowl or trough in operable contact with said rod to displace said rod in one direction to open said first check valve and to allow displacement of said rod in the other direction to close said first check valve,
   a drain-back valve near the bottom of said conduit above said first check valve to drain water from said conduit through its outlet when said first valve is operable to an open position, whereby to relieve pressure therefrom, and
   displaceable means to render said valve inoperable, so as to maintain the level of water at the top of said conduit when said first check valve is in the closed position.

6. The animal watering fountain according to claim 5 wherein said displaceable means to render said valve inoperative has an upper end at a location above the frost line and a lower end at the drain-back valve, whereby said displaceable means may be displaced by manipulating said upper end.

7. The animal watering fountain according to claim 5 wherein said displaceable means includes a vertical sealed pipe having a connection at its lower end for connection to the outlet of said drain-back valve to render it inoperable.

8. The animal watering fountain of claim 7 including a guide mounted on said water feeding conduit intermediate said bowl or trough and said first check valve, said guide receiving said vertical pipe and positioning it for connection to the outlet of said drain-back valve.

* * * * *